US006981101B1

(12) United States Patent
Miller et al.

(10) Patent No.: US 6,981,101 B1
(45) Date of Patent: Dec. 27, 2005

(54) METHOD AND SYSTEM FOR MAINTAINING DATA AT INPUT/OUTPUT (I/O) INTERFACES FOR A MULTIPROCESSOR SYSTEM

(75) Inventors: Steven C. Miller, Livermore, CA (US); Daniel E. Lenoski, San Jose, CA (US); Kevin Knecht, Chippewa Falls, WI (US); George Hopkins, Chippewa Falls, WI (US); Michael S. Woodacre, Sutton Benger (GB)

(73) Assignee: Silicon Graphics, Inc., Mountain View, CA (US)

( * ) Notice: Subject to any disclaimer, the term of this patent is extended or adjusted under 35 U.S.C. 154(b) by 632 days.

(21) Appl. No.: 09/910,531

(22) Filed: Jul. 20, 2001

Related U.S. Application Data

(60) Provisional application No. 60/219,938, filed on Jul. 20, 2000.

(51) Int. Cl.[7] .............................................. G06F 12/00
(52) U.S. Cl. ..................................... 711/141; 711/120
(58) Field of Search ......................................... 711/120

(56) References Cited

U.S. PATENT DOCUMENTS

| | | | |
|---|---|---|---|
| 5,623,628 A | | 4/1997 | Brayton et al. |
| 5,752,264 A | | 5/1998 | Blake et al. |
| 6,085,263 A | * | 7/2000 | Sharma et al. ............. 710/56 |
| 6,209,064 B1 | | 3/2001 | Weber |
| 6,516,372 B1 | | 2/2003 | Anderson et al. |
| 2002/0087807 A1 | * | 7/2002 | Gharachorloo et al. ..... 711/141 |
| 2003/0115422 A1 | * | 6/2003 | Spencer et al. ............. 711/137 |
| 2003/0120875 A1 | * | 6/2003 | Bourne et al. ............. 711/144 |
| 2004/0088487 A1 | * | 5/2004 | Barroso et al. ............. 711/122 |

OTHER PUBLICATIONS

Culler et al. "Parallel Computer Architecture," San Francisco: Morgan-Kaufmann, 1998.*
Kien A. Hua, et al. "Interconnecting Shared-Everything Systems for Efficient Parallel Query Processing", IEEE, pp. 262-270, 1991.

* cited by examiner

*Primary Examiner*—Mano Padmanabhan
*Assistant Examiner*—Paul Baker
(74) *Attorney, Agent, or Firm*—Baker Botts L.L.P.

(57) ABSTRACT

A multiprocessor system and method includes a processing sub-system having a plurality of processors and a processor memory system. A scalable network is operable to couple the processing sub-system to an input/output (I/O) sub-system. The I/O sub-system includes a plurality of I/O interfaces. Each I/O interface has a local cache and is operable to couple a peripheral device to the multiprocessor system and to store copies of data from the processor memory system in the local cache for use by the peripheral device. A coherence domain for the multiprocessor system includes the processors and processor memory system of the processing sub-system and the local caches of the I/O sub-system.

25 Claims, 9 Drawing Sheets

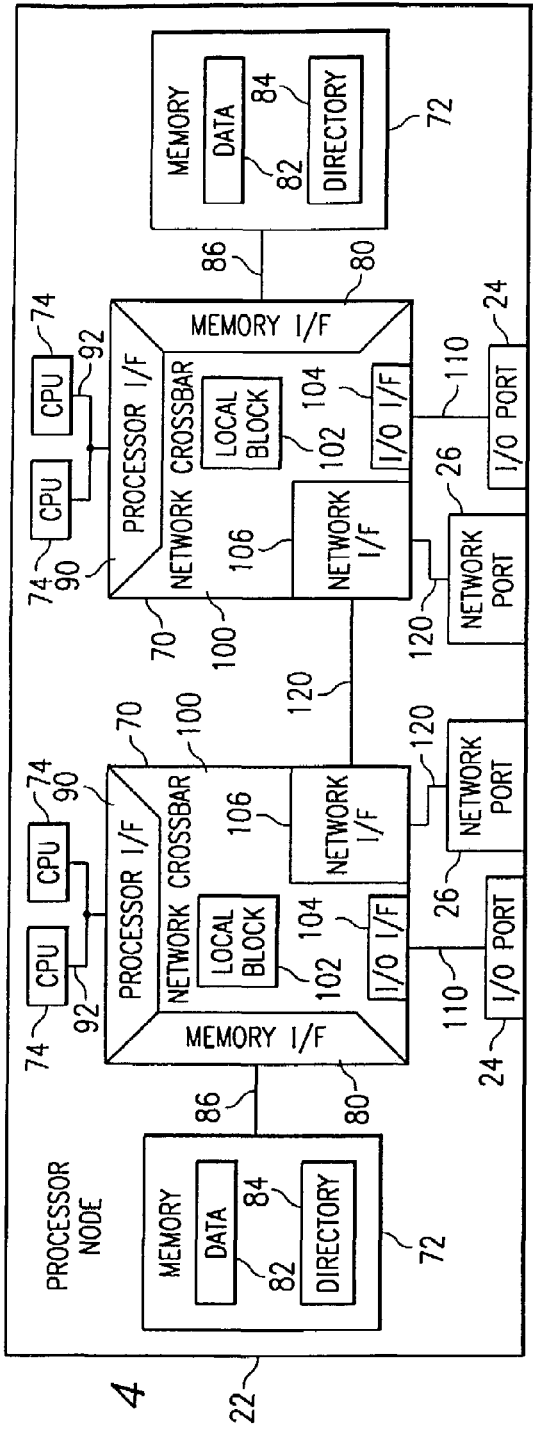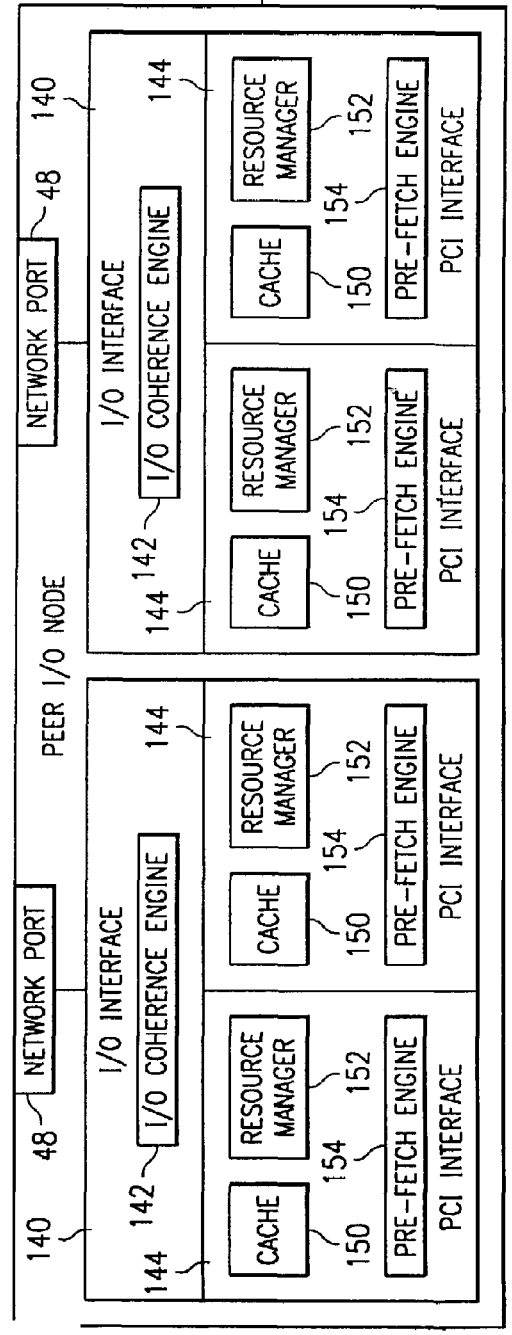

| | GROUP | NAME | DESCRIPTION | |
|---|---|---|---|---|
| READ (910) | SHARED | READ | READ | 910a |
| | | RDSHD | READ SHARED | |
| | EXCLUSIVE | RDEXC | READ EXCLUSIVE | 910b |
| | | RDXRO | EXCLUSIVE READ-ONLY TIMED | |
| | | RDXRN | EXCLUSIVE READ-ONLY UNTIMED | |
| | GET | GET | READ INVALID | 910c |
| | | GETF | READ INVALID, FORCED | |
| | etc. | AMOR | ATOMIC MEMORY OPERATION, READ | 910d |
| | | NCRD | NON-COHERENT READ | |
| WRITE (912) | WRITEBACK | WRBK | WRITEBACK | 912a |
| | | WRBKR | WRITEBACK, CONCURRENT READ OUTSTANDING | |
| | | IWE | IMPLICIT WRITEBACK EXCLUSIVE | |
| | | RQSH | CEX DROP (RELINQUISH) | |
| | | RQSHR | CEX DROP, CONCURRENT READ OUTSTANDING | |
| | PUT | PUT | WRITE INVALIDATE | 912b |
| | | PFCL | CACHE LINE FLUSH | |
| | ETC. | AMOW | ATOMIC MEMORY OPERATION, WRITE | 912c |
| | | NCWRD | NON-COHERENT WRITE, DOUBLEWORD | |
| | | NCWRF | NON-COHERENT WRITE, CACHE LINE | |
| PROBE (914) | SHARED | INTER | INTERVENTION SHARED | 914a |
| | EXCLUSIVE | INEXC | INTERVENTION EXCLUSIVE | 914b |
| | | FLSH | FLUSH | |
| | | ERASE | ERASE | |
| | GET | ININV | INTERVENTION INVALID | 914c |
| | | ININF | INTERVENTION INVALID, FORCED | |
| | ETC. | INVAL | INVALIDATE | 914d |
| INVAL GENERATION (916) | | BINEV | BACKOFF INVALIDATE ECHO, VECTOR FORMAT | |
| | | LINV | LOCAL BLOCK INVALIDATE VECTOR | |

| Group | | Name | Description | |
|---|---|---|---|---|
| READ | SHARED | SRPLY | SHARED REPLY | 1010a |
| | | SRESP | SHARED RESPONSE | |
| | | SACK | SHARED ACKNOWLEDGE | |
| | | BINTR | BACKOFF INTERVENTION SHARED | |
| | EXCLUSIVE | ERPLY | EXCLUSIVE REPLY | 1010b |
| | | ESPEC | EXCLUSIVE SPECULATIVE REPLY | |
| | | ERESP | EXCLUSIVE RESPONSE | |
| | | EACK | EXCLUSIVE ACKNOWLEDGE | |
| | | ERPYP | EXCLUSIVE REPLY, SEND PRGE | |
| | | BIEXC | BACKOFF INTERVENTION EXCLUSIVE | |
| | | BINVV | BACKOFF INVALIDATE, VECTOR FORMAT | |
| | | BINVP | BACKOFF INVALIDATE, POINTER FORMAT | |
| | GET | IRPLY | INVALID REPLY | 1010c |
| | | ISPEC | INVALID SPECULATIVE REPLY | |
| | | IRESP | INVALID RESPONSE | |
| | | IACK | INVALID ACKNOWLEDGE | |
| | | NACKG | NEGATIVE ACKNOWLEDGE TO GET | |
| | | BIINV | BACKOFF INTERVENTION INVALID | |
| | | BIINF | BACKOFF INTERVENTION INVALID FORCED | |
| | ETC. | AARP | AMO READ REPLY | 1010d |
| | | NCRP | NON-COHERENT READ REPLY | |
| | | NACK | COHERENT READ NEGATIVE ACKNOWLEDGE | |
| WRITE | WRITEBACK | WBACK | WRITEBACK ACKNOWLEDGE | 1012a |
| | | WBBACK | WRITEBACK BUSY ACKNOWLEDGE | |
| | PUT | WACK | WRITE INVALIDATE ACKNOWLEDGE | 1012b |
| | | WACKP | WRITE INVALIDATE ACK, SEND PRGE | |
| | | WNACK | WRITE INVALIDATE NEGATIVE ACKNOWLEDGE | |

FROM FIG. 10A

| | | | | |
|---|---|---|---|---|
| 1012 { WRITE | PUT | BFLSH | BACKOFF FLUSH | } 1012b |
| | | BERSE | BACKOFF ERASE | |
| | ETC. | AWAK | AMO WRITE ACKNOWLEDGE | } 1012c |
| | | NCWAK | NON-COHERENT WRITE ACKNOWLEDGE | |
| 1014 { PROBE | SHARED | SHWB | SHARING WRITEBACK | } 1014a |
| | | DNGRD | DOWNGRADE | |
| | | SHWBR | SHARING WRITEBACK, PRIOR WB PENDING | |
| | | DNGDR | DOWNGRADE WITH PRIOR WB PENDING | |
| | EXCLUSIVE | PRGE | PURGE | } 1014b |
| | | XFER | OWNERSHIP TRANSFER | |
| | | PRGER | PURGE WITH PRIOR WB PENDING | |
| | | XFERR | OWNERSHIP TRANSFER, PRIOR WB PENDING | |
| | | IWACK | IMPLICIT WRITEBACK RACE ACKNOWLEDGE | |
| | GET | IIACK | INTERVENTION INVALID ACK | } 1014c |
| | ETC. | IVACK | INVALIDATE ACK | } 1014d |
| 1016 { ERROR | | PERR | POISONED ACCESS ERROR | |
| | | AERR | READ PROTECTION VIOLATION ERROR | |
| | | WERR | WRITE PROTECTION VIOLATION ERROR | |
| | | DERRR | DIRECTORY ERROR ON A READ REQUEST | |
| | | DERRW | DIRECTORY ERROR ON A WRITE REQUEST | |

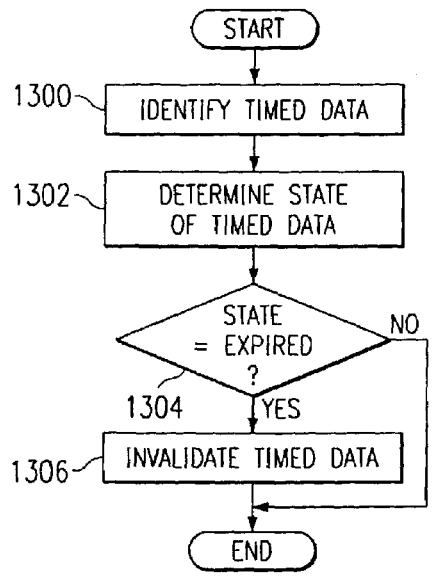
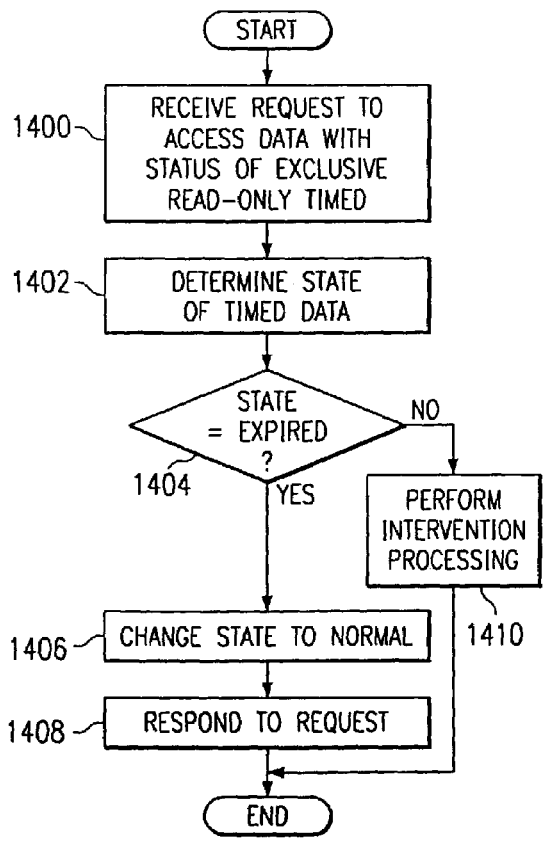
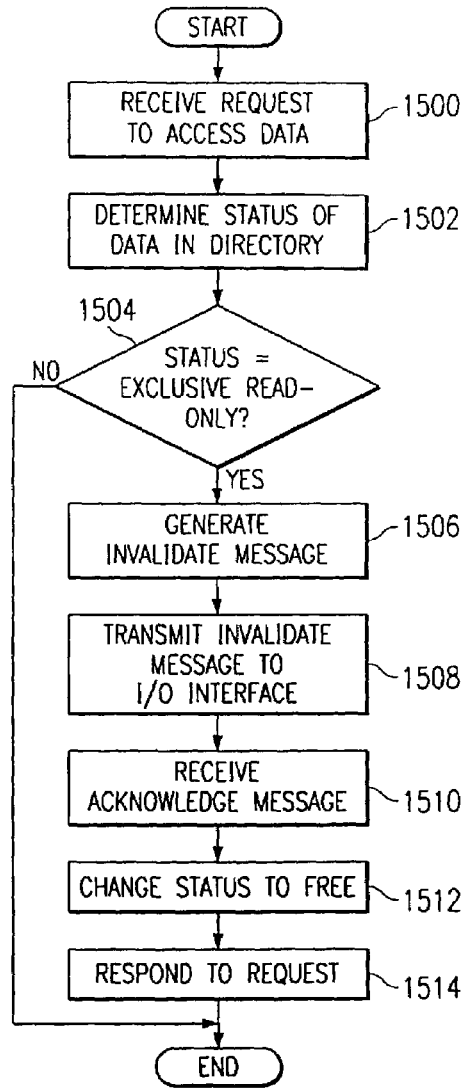

METHOD AND SYSTEM FOR MAINTAINING DATA AT INPUT/OUTPUT (I/O) INTERFACES FOR A MULTIPROCESSOR SYSTEM

RELATED APPLICATIONS

This application claims the benefit of U.S. Provisional Application Ser. No. 60/219,938 filed Jul. 20, 2000.

TECHNICAL FIELD OF THE INVENTION

This invention relates generally to the field of multiprocessor systems, and more particularly, to a method and system for maintaining data at input/output (I/O) interfaces for a multiprocessor system.

BACKGROUND OF THE INVENTION

Multiprocessor computers often include a large number of computer processors that may operate in parallel. Parallel processing computer architectures include cache-coherent multiprocessors with non-uniform memory access (NUMA) architecture. NUMA architecture refers to a multiprocessor system in which each processor has its own local memory that can also be accessed by the other processors in the system. NUMA architecture is non-uniform in that memory access times are faster for a processor accessing its own local memory than for a processor accessing memory local to another processor.

In order to maintain cache coherence and protect memory pages from unauthorized access, a protection scheme is generally used to enable or disable shared access to a memory page. A memory page may include data, as well as a directory for tracking states associated with cache lines for the memory page. Conventional memory protection schemes utilize memory protection codes to indicate whether a particular element may access the memory page.

For non-shared access to a cache line, the memory protection code simply has to track the single element with access to the cache line. However, for shared access to a cache line, the memory protection code has to track all the elements with access to the cache line in order to notify those elements when their copies of the cache line have been invalidated. Thus, for a memory protection code of a specific size, a fixed number of elements may be tracked, limiting the number of elements that may share access to a cache line.

Conventional systems have attempted to solve this problem by using aliased elements. This approach has the memory protection code tracking a number of elements together such that when one element has shared access to a cache line, the memory protection code indicates that multiple elements have shared copies of the cache line. However, as the number of aliased elements increases, the efficiency of the system is reduced in that a greater number of elements that are not actually storing a copy of the cache line must be notified of modifications to the cache line.

Efficiency is further reduced by data caching at input/output (I/O) elements of the system. Because such data is inherently unreliable, validity messages must be transmitted back and forth between the memory storing the data and the I/O element caching a copy of the data. Transmitting these messages consumes available bandwidth. Attempting to solve this problem by tracking I/O elements, in addition to processors, with the memory protection code increases the problem of aliasing caused by the limited size of a memory protection code.

SUMMARY OF THE INVENTION

The present invention provides a method and system for maintaining data at input/output (I/O) interfaces for a multiprocessor system that significantly eliminate or reduce problems and disadvantages associated with previous systems and methods. In particular, the I/O interfaces are included within the coherence domain of the multiprocessor system to improve pre-fetching and data caching at the I/O interfaces.

In accordance with one embodiment of the present invention, a multiprocessor system and method includes a processing sub-system having a plurality of processors and a processor memory system. A scalable network % is operable to couple the processing sub-system to an I/O sub-system. The I/O sub-system includes a plurality of I/O interfaces. Each I/O interface has a local cache and is operable to couple a peripheral device to the multiprocessor system and to store copies of data from the processor memory system in the local cache for use by the peripheral device. A coherence domain for the multiprocessor system includes the processors and processor memory system of the processor sub-system and the local caches of the I/O sub-system.

More specifically, in accordance with a particular embodiment of the present invention, the processor memory system includes a plurality of discrete memories. The discrete processor memories may each be dedicated to a processor. In this and other embodiments, the processor memory system may include a directory operable to identify data having a copy cached in an I/O interface. The processor memory is operable to invalidate a copy of data stored in an I/O interface in response to a request for the data by a processor or other element of the system.

Technical advantages of the present invention include providing an improved scalable computer system. In particular, I/o interfaces are coupled to processors through a fully scalable router network to provide pure I/o. As a result, I/o is fully scalable in the same dimension as processors.

Another technical advantage of the present invention includes providing an improved method and system for maintaining data at I/O interfaces for a multiprocessor system. In particular, the I/O interfaces are included within the coherence domain of the system to improve data caching at the interfaces. As a result, data can be intelligently pre-fetched and used by peripheral devices at the interfaces.

Other technical advantages of the present invention will be readily apparent to one skilled in the art from the following figures, description, and claims.

BRIEF DESCRIPTION OF THE DRAWINGS

For a more complete understanding of the present invention and its advantages, reference is now made to the following description taken in conjunction with the accompanying drawings, wherein like numerals represent like parts, in which:

FIG. 4 is a block diagram illustrating details of a processor node of FIG. 2 in accordance with one embodiment of the present invention;

FIG. 7 is a block diagram illustrating details of a peer I/O node of FIG. 2 in accordance with one embodiment of the present invention;

FIG. 9 is a table illustrating operations operable to be requested by elements of the multiprocessor system of FIG. 2 in accordance with one embodiment of the present invention;

FIGS. 10A–B is a table illustrating operations operable to be performed by elements of the multiprocessor system of FIG. 2 in response to the requests of FIG. 9 in accordance with one embodiment of the present invention;

FIG. 13 is a flow diagram illustrating one embodiment of a method for managing data cached according to the method of FIG. 12 at an I/O node of FIGS. 2 and 7;

FIG. 14 is a flow diagram illustrating one embodiment of a method for managing data cached according to the method of FIG. 12 at a processor node of FIGS. 2 and 4; and FIG. 15 is a flow diagram illustrating a method for intervention processing by a processor node of FIGS. 2 and 4 in accordance with one embodiment of the present invention.

DETAILED DESCRIPTION OF THE INVENTION

Figure 1:
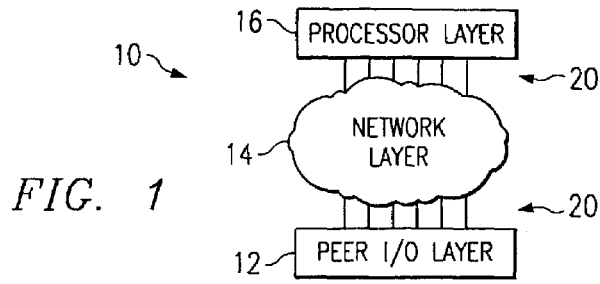
FIG. 1 is a block diagram illustrating a multiprocessor system for providing a peer input/output (I/O) layer in accordance with one embodiment of the present invention.

FIG. 1 is a block diagram illustrating a multiprocessor system 10 in accordance with one embodiment of the present invention. In this embodiment, the system 10 is fully scalable in both the processor and input/output (I/O) direction. Accordingly, the system 10 may be readily adapted to any suitable environment.

The system 10 comprises a peer I/O layer 12, a network layer 14 and a processor layer 16. The peer I/O layer 12, or I/O sub-system, is a peer layer in that it may communicate with the network layer 14 in the same manner as the processor layer 16, or processing sub-system. The network layer 14 couples the peer I/O layer 12 to the processor layer 16 such that the processor layer 16 may communicate with the peer I/O layer 12. Each layer 12 and 16 is coupled to the network layer 14 through communications lines 20. As used herein, "each" means every one of at least a subset of the identified items. The communication lines 20 may be any suitable wireline or wireless communication link capable of supporting data transfer.

Figure 2:
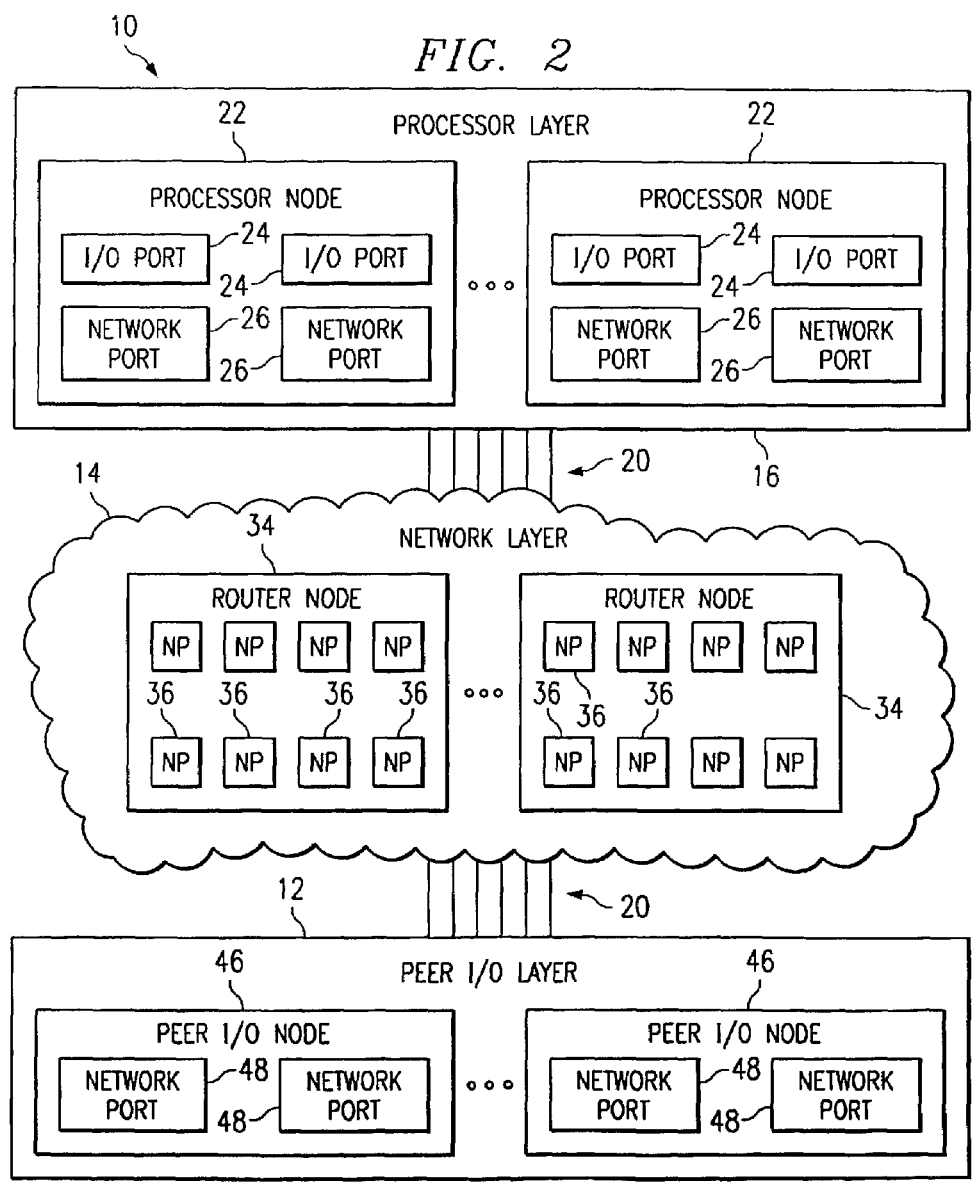
FIG. 2 is a block diagram illustrating details of the multiprocessor system of FIG. 1.

FIG. 2 is a block diagram illustrating details of the multiprocessor system 10. The processor layer 16 comprises a plurality of processor nodes 22. According to one embodiment, each processor node 22 comprises two I/O ports 24 and two network ports 26. Each I/O port 24 is operable to provide communication between the processor node 22 and a peripheral device such as a tape, disk, network or any other suitable peripheral device. Each network port 26 is operable to provide communication between the processor node 22 and the network layer 14 through the communication lines 20. In accordance with one embodiment, the network ports 26 comprise non-uniform memory access (NUMA) ports.

The network layer 14 comprises a plurality of router nodes 34. Each router node 34 comprises a plurality of network ports 36 for communicating with the processor layer 16 and/or the peer I/O layer 12. According to one embodiment, each network port 36 comprises a NUMA port.

The peer I/O layer comprises a plurality of peer I/O nodes 46. According to one embodiment, each peer I/O node 46 comprises two network ports 48. Each network port 48 is operable to provide communication between the peer I/O node 46 and the network layer 14. In accordance with one embodiment, each network port 48 comprises a NUMA port.

Each of the network ports 26, 36 and 48 are operable to provide communication between the corresponding node 22, 34, or 46 and any other node 22, 34 or 46. Thus, for example, the I/O nodes 46 may communicate with each other through their network ports 48 without an intervening router node 34.

Figure 3:
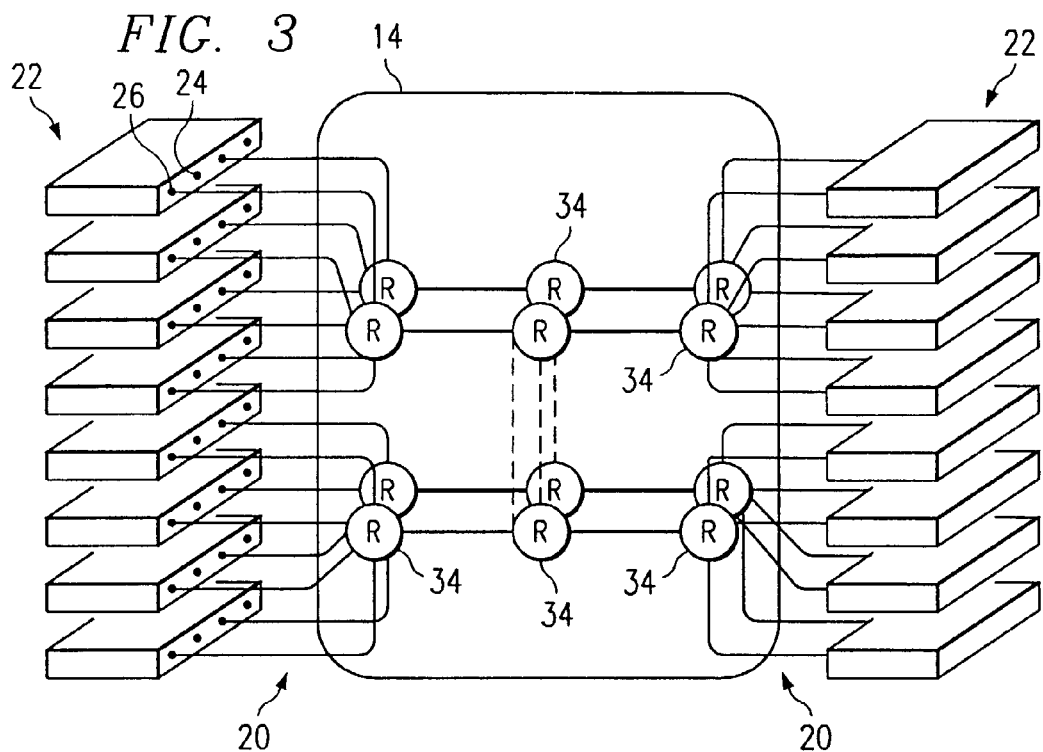
FIG. 3 is a block diagram illustrating the interconnection of router nodes of FIG. 2 in accordance with one embodiment of the present invention.

FIG. 3 is a block diagram illustrating the interconnection of router nodes 34 in accordance with one embodiment of the present invention. In this embodiment, each network port 26 of each processor node 22 is coupled to a network port 36 of a router node 34 by a communication line 20. The router nodes 34 which are coupled to the network ports 26 may also be coupled to other router nodes 34. For this embodiment, a network port 36 of one router node 34 is coupled by a communication line 20 to a network port 36 of another router node 34. In this way, a network layer 14 may be formed that allows communication between processor nodes 22 and peer I/O nodes 46 (not shown in FIG. 3). For example, a router node 34 may be coupled to processor nodes 22, I/O nodes 46 and/or other router nodes 34, each of which may be coupled to additional processor nodes 22, I/O nodes 46 and/or other router nodes 34. Thus, a network layer 14 may be formed to provide communication between any suitable combination of processor nodes 22 and I/O nodes 46.

FIG. 4 is a block diagram illustrating details of a processor node 22. In addition to the I/O ports 24 and network ports 26, the illustrated processor node 22 comprises two superhubs (SHUBs) 70. It will be understood, however, that a processor node 22 may comprise any suitable number of SHUBs 70 or other suitable multiprocessor sub-systems without departing from the scope of the present invention. In accordance with the illustrated embodiment, each SHUB 70 is coupled to a processor memory 72 and a pair of processors 74. Collectively, the memories 72 of the system 10 form a processor memory system. However, it will be understood that the processor memory system may comprise any one or more of the memories 72 without departing from the scope of the present invention.

The SHUB 70 comprises a memory interface 80 for communicating with the memory 72. The memory 72 comprises data 82, as well as a directory 84 for managing access to the data 82. The memory 72 is accessed through the memory interface 80 over line 86. According to one embodiment, the line 86 may communicate data between the memory 72 and the memory interface 80 at a rate of approximately 10 gigabytes per second.

The SHUB 70 also comprises a processor interface 90 for communicating with the processors 74 over line 92.

Although the illustrated embodiment comprises two processors 74 for each SHUB 70, it will be understood that any suitable number of processors 74 may be coupled to each SHUB 70 without departing from the scope of the present invention.

The SHUB 70 further comprises a network crossbar 100. The network crossbar 100 comprises a local block 102 for performing miscellaneous functions such as providing a global clock, maintenance features, and other administrative functions, an I/O interface 104 for providing communication between the SHUB 70 and an I/O port 24, and a network interface 106 for providing communication between the SHUB 70 and a network port 26. The network crossbar 100 is operable to provide communication between the components of the SHUB 70 and the network interface 106.

The I/O interface 104 may communicate with the I/O port 24 over line 110. According to one embodiment, communication may be provided over line 110 at a rate of approximately 1.2 gigabytes per second. The network interface 106 may communicate with a network port 26 over line 120. In addition, as illustrated in FIG. 4, the network interfaces 106 of the two SHUBs 70 may communicate with each other over line 120. According to one embodiment, the lines 120 comprise NUMA links and provide communication at a rate of approximately 1.6 gigabytes per second or 3.2 gigabytes per second.

Figure 5:
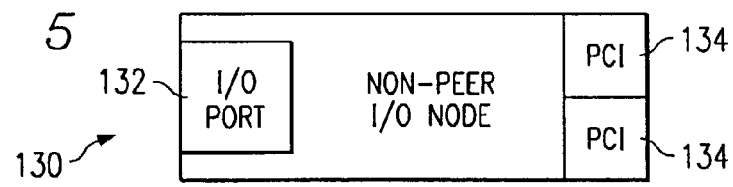
FIG. 5 is a block diagram illustrating a non-peer I/O node for use with the system of FIG. 2 in accordance with one embodiment of the present invention.

FIG. 5 is a block diagram illustrating a non-peer I/O node 130 for use with the system 10. The non-peer I/O node 130 is operable to provide communication between an I/O port 24 of a processor node 22 and a peripheral device. The non-peer I/O node 130 comprises an I/O port 132 for coupling the non-peer I/O node 130 to the I/O port 24 of the processor node 22. The illustrated non-peer I/O node 130 also comprises two peripheral component interfaces (PCIS) 134 or other suitable interfaces. It will be understood, however, that a non-peer I/O node 130 may comprise any suitable number of PCIs 134 without departing from the scope of the present invention. Each PCI 134 may provide communication between the non-peer I/O node 130 and a peripheral device such as a tape, disk, network or other suitable peripheral device.

Figure 6:
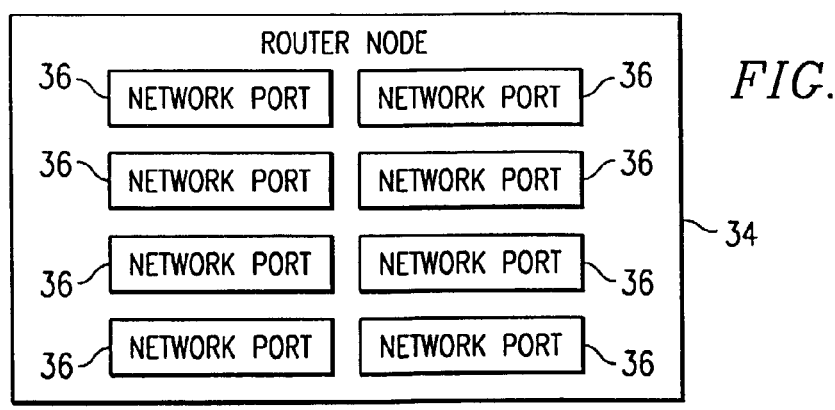
FIG. 6 is a block diagram illustrating details of a router node of FIG. 2 in accordance with one embodiment of the present invention.

FIG. 6 is a block diagram illustrating details of a router node 34. In accordance with the illustrated embodiment, each router node 34 comprises eight network ports 36. However, it will be understood that a router node 34 may comprise any suitable number of network ports 36 without departing from the scope of the present invention. The network ports 36 each comprise a NUMA port that is operable to provide communication between the router node 34 and a processor node 22 through a network port 26 of the processor node 22, between the router node 34 and a peer I/O node 46 through a network port 48 of the peer I/O node 46 or between the router node 34 and another router node 34 through a network port 36 of the other router node 34. Thus, as described in more detail above in connection with FIG. 3, for the embodiment in which the router node 34 comprises eight network ports 36, any suitable combination of up to eight processor nodes 22, peer I/O nodes 46 and/or router nodes 34 may be coupled together through a router node 34 by the network ports 36.

FIG. 7 is a block diagram illustrating details of a peer I/O node 46. In addition to the network ports 48, the I/O node 46 comprises an I/O interface 140 corresponding to each network port 48. Each I/O interface 140 comprises an I/O coherence engine 142 and a PCI or other suitable interface 144. The I/O coherence engine 142 is operable to communicate with the processor layer 16 using a distributed memory protocol to retrieve copies of requested data. The system 10 comprises a distributed memory comprising the memories 72 of the processor nodes 22 and the caches 150 of the I/O nodes 46. The distributed memory protocol allows the system 10 to maintain the reliability of the data in the distributed memory. The I/O coherence engine 142 may comprise logic stored in a computer-processable medium. The logic may be encoded in hardware and/or software instructions stored in RAM, ROM and/or other suitable computer-processable media.

The PCI interface 144 comprises a memory such as a cache 150, a resource manager 152, and a pre-fetch engine 154. The cache 150, which comprises any suitable data store, is operable to cache coherent data for the corresponding peripheral device, as described in more detail below in connection with FIG. 8. The resource manager 152 is operable to invalidate data in the cache 150 that has expired or that has been designated as invalid by a processor node 22. Invalidating data comprises deleting the data, writing over the data or otherwise preventing future use of the data. The resource manager 152 may comprise logic stored in a computer-processable medium. The pre-fetch engine 154 is operable to identify data to pre-fetch and pre-fetch the identified data for storage in the cache 150 for the benefit of the corresponding peripheral device. The pre-fetch engine 154 may also comprise logic stored in a computer-processable medium.

The PCI interface 144 is operable to provide communication between the I/O node 46 and a peripheral device. Thus, each I/O node 46 may communicate with a router node 34 in the same manner that a processor node 22 communicates with a router node 34 and may also communicate with any suitable peripheral device through the PCI interface 144. In this way, communication may be provided between any processor node 22 and any peripheral device.

Figure 8:
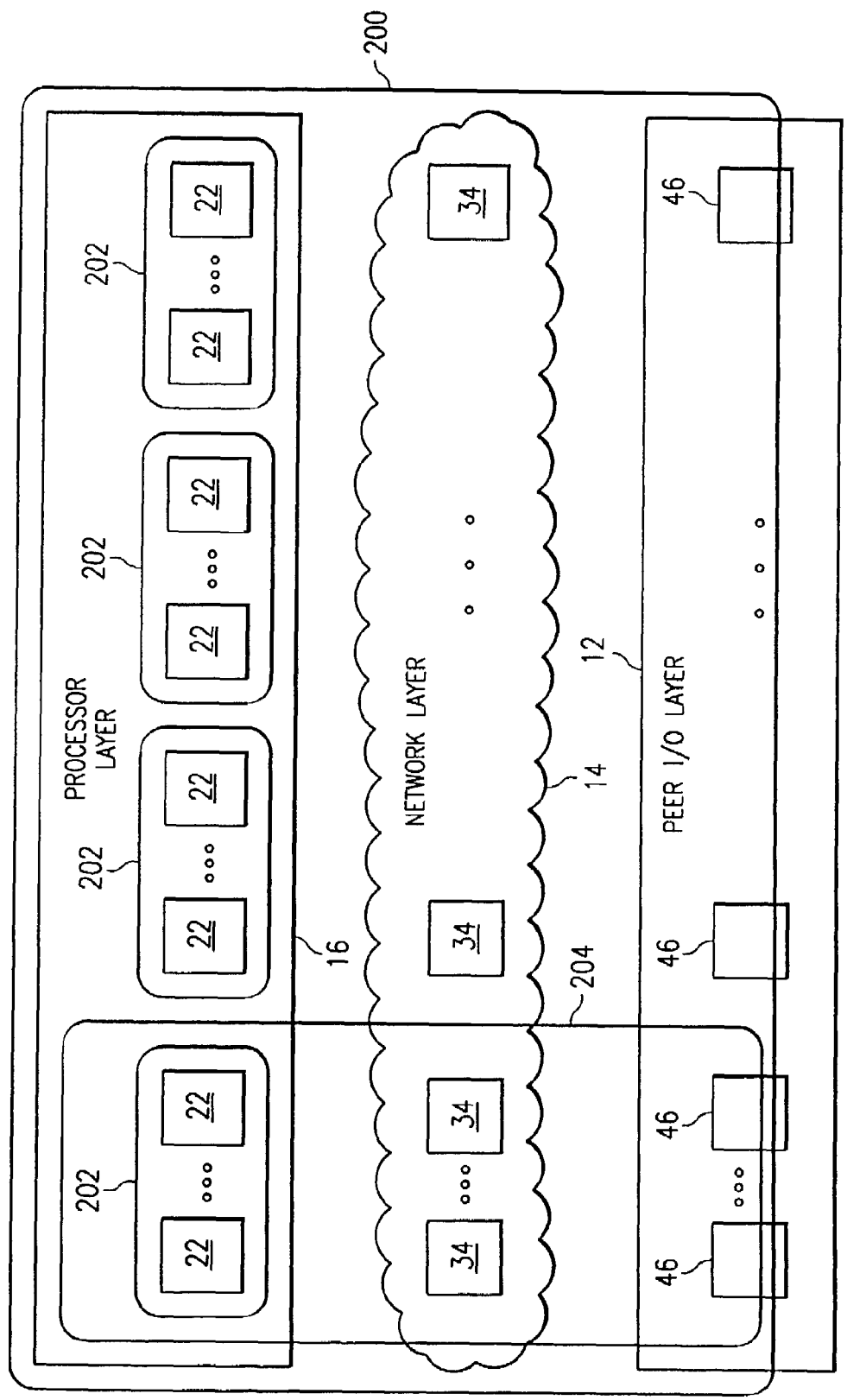
FIG. 8 is a block diagram illustrating coherence domains for the multiprocessor system of FIG. 2 in accordance with one embodiment of the present invention.

FIG. 8 is a block diagram illustrating coherence domains 200, 202, 204 for the multiprocessor system 10. The coherence domains comprise a system coherence domain 200, a plurality of processor coherence domains 202, and a plurality of partition coherence domains 204. Data sharing is provided between elements of the system 10 based on the coherence domains 200, 202 and 204 in which the elements exist.

The system coherence domain 200 comprises the processor layer 16, the network layer 14 and a portion of the peer I/O layer 12. The system coherence domain 200 comprises each cache 150 in each I/O node 46 in the peer I/O layer 12. Thus, as described below, each I/O node 46 is operable to cache coherent data from any memory 72 of any processor node 22 in the system 10.

The directory 84 for each memory 72 in a processor node 22 comprises information relating to a status for each cache line of data 82. A cache line of data 82 may comprise 128 bytes or any other suitable amount of data 82. In accordance with the distributed memory protocol of the present invention, the status may comprise free, shared, exclusive, exclusive read-only untimed, exclusive read-only timed, or other suitable status.

A status of free indicates that the corresponding data 82 is unowned, with no elements of the system 10 storing a copy of the data 82. A status of shared indicates that copies of the corresponding data 82 are currently stored in other elements of the system 10. Thus, if data 82 with a status of shared is modified, the memory 72 notifies each element with a copy of the data 82 to invalidate the stored copy. A status of exclusive indicates that the corresponding data 82 is owned by a particular element of the system 10 such that the element may read from and write to the cache line in the memory 72 that comprises the data 82, while no other elements of the system 10 are permitted to receive a copy of the data 82.

A status of exclusive read-only untimed indicates that the corresponding data 82 is owned by an I/O node 46. The I/O node 46 has an exclusive copy of the cache line in that no other copies are permitted to be transmitted to other elements of the system 10 while the data 82 has a status of exclusive read-only untimed. However, the data 82 is also read-only in that the I/O node 46 has access to read the cache line but does not have access to write to the cache line.

A status of exclusive read-only timed is similar to a status of exclusive read-only untimed, with the I/O node 46 having access only to read the cache line and no other components of the system 10 having access to the cache line. However, data 82 with a status of exclusive read-only timed is updated to a status of free once a predefined period of time has passed after an initiation event that designates the data 82 as exclusive read-only timed.

Thus, the I/O node 46 has transient access to the cache line for the predefined period of time, after which the memory 72 changes the status in the directory 84 to free and the resource manager 152 invalidates the copy of the data 82 in the cache 150. This allows the sending of messages back and forth to invalidate the data in the cache 150 to be avoided in most situations, resulting in a significant decrease in wasted bandwidth.

According to one embodiment, the initiation event designating the data 82 as exclusive read-only timed may be the request for access to the data by the I/O node 46. The I/O node 46 may store a time-stamp associated with the request time. The data in the cache 150 would then be considered reliable until the predefined period of time passed after the request time. The I/O node 46 may transmit this request time to the memory 72 such that the memory 72 may determine that the data in the cache 150 has become unreliable at substantially the same time as the I/O node 46. Alternatively, the memory 72 may store a time-stamp associated with the response time, using the response time as an initiation event. In this situation, the memory 72 would determine that the data in the cache 150 had become unreliable at a later time than the I/O node 46.

The use of the exclusive read-only statuses for I/O nodes 46, therefore, allows I/O nodes 46 to cache coherent data without affecting the number of processor nodes 22 that may be tracked by a sharing vector. A sharing vector tracks the location of shared copies of data 82. Because the I/O nodes 46 have exclusive, as opposed to shared, access to the data 82, an unlimited number of I/O nodes 46 may be included in the system coherence domain 200 regardless of the size of the sharing vector.

The processor coherence domains 202 comprise processor nodes 22 that may coherently share data. According to one embodiment, each processor coherence domain 202 comprises 128 processor nodes 22. It will be understood, however, that a processor coherence domain 202 may comprise any suitable number of processor nodes 22 without departing from the scope of the present invention. Each processor coherence domain 202 comprises a sharing vector independent of the other processor coherence domains 202. In order to keep track of an increased number of processor nodes 22 without increasing the size of the sharing vector, aliasing of processor nodes 22 may be used by the sharing vector.

For example, the sharing vector may indicate that four processor nodes 22 have shared copies of a cache line when only one of the processor nodes 22 actually has a copy of the cache line. In this situation, the sharing vector would track one sharing processor node 22 with a copy of the data 82 and three aliased processor nodes 22 without copies of the data 82. It will be understood, however, that the sharing vector may track any suitable number of aliased processor nodes 22 in addition to each sharing processor node 22 without departing from the scope of the present invention.

Using aliased processor nodes 22 allows more processor nodes 22 in general to be tracked by a sharing vector that is limited in size. However, as the number of aliased nodes 22 increases, the efficiency of the system 10 is reduced in that a greater number of processor nodes 22 that are not storing a copy of the data 82 must be notified of modifications to the data 82. Thus, the system 10 comprises multiprocessor coherence domains 202 each having its own sharing vector. In this way, the system may comprise an increased number of processor nodes 22 without a corresponding increase in aliasing by the sharing vector. According to one embodiment, the sharing vector may be 32 bits in size for a multiprocessor system having more than 512 processors 74. For the illustrated embodiment comprising four processor coherence domains 202, the sharing vector may be 32 bits in size and support 2,048 processors 74.

In this embodiment, therefore, processor nodes 22 within a same processor coherence domain 202 may share copies of a cache line with each other. In addition, any processor node 22 in the system 10 may obtain an exclusive copy of a cache line from any other processor node 22 in the system 10 regardless of whether or not they are in the same processor coherence domain 202. Each processor node 22 may comprise an identifier to indicate in which processor coherence domain 202 the processor node 22 exists. Upon requesting shared access to data, a processor node 22 may provide its identifier along with or as part of the request. According to one embodiment, a specified number of the most significant bits of the identifier may identify the processor coherence domain 202.

In accordance with an alternative embodiment of the present invention, processor nodes 22 in one processor coherence domain 202 may share copies of data 82 in the memory 72 of another processor coherence domain 202. For this embodiment, processor nodes 22 in other processor coherence domains 202, including the processor coherence domain 202 comprising the processor node 22 storing the data 82, may have exclusive copies of the data 82 but may not share copies.

The partition coherence domains 204, only one of which is illustrated in FIG. 8, comprise a plurality of processor nodes 22, a plurality of router nodes 34 and a portion of each of a plurality of peer I/O nodes 46. The portion of each I/O node 46 in the partition coherence domain 204 comprises each cache 150 in the I/O node 46.

According to one embodiment, partition coherence domains 204 comprise elements of the system 10 that may operate on an operating system that is independent of operating systems for the other partition coherence domains 204. This type of coherence domain 204 provides error containment for operating system references.

According to one embodiment, each partition coherence domain 204 comprises 128 processor nodes 22, in addition to a plurality of router nodes 34 and I/O nodes 46. It will be understood, however, that the partition coherence domains 204 may comprise any suitable number of nodes 22, 34, and 46 and that each partition coherence domain 204 may comprise a different number of nodes 22, 34 and 46.

FIG. 9 is a request table 900 illustrating operations operable to be requested by elements of the multiprocessor system 10 in accordance with one embodiment of the present invention. The request table 900 comprises a group column 902, a name column 904, and a description column 906. The groups 902 comprise a read group 910, a write group 912, a probe group 914, and an invalidate group 916.

The read group 910 comprises a shared sub-group 910a, an exclusive sub-group 910b, a get sub-group 910c and a miscellaneous sub-group 910d. The write group 912 comprises a write-back sub-group 912a, a put sub-group 912b and a miscellaneous sub-group 912c. The probe group 914 comprises a shared sub-group 914a, an exclusive sub-group 914b, a get sub-group 914c and a miscellaneous sub-group 914d.

FIGS. 10A–B is a response table 1000 illustrating operations operable to be performed by elements of the multiprocessor system 10 in response to the requests illustrated in the request table 900 in accordance with one embodiment of the present invention. The response table 1000 comprises a group column 1002, a name column 1004, and a description column 1006. The group column 1002 comprises a read group 1010, a write group 1012, a probe group 1014, and an error group 1016.

The read group 1010 comprises a shared sub-group 1010a, an exclusive sub-group 1010b, a get sub-group 1010c, and a miscellaneous sub-group 1010d. The write group 1012 comprises a write-back sub-group 1012a, a put sub-group 1012b, and a miscellaneous sub-group 1012c. The probe group 1014 comprises a shared sub-group 1014a, an exclusive sub-group 1014b, a get sub-group 1014c, and a miscellaneous sub-group 1014d.

Figure 11:
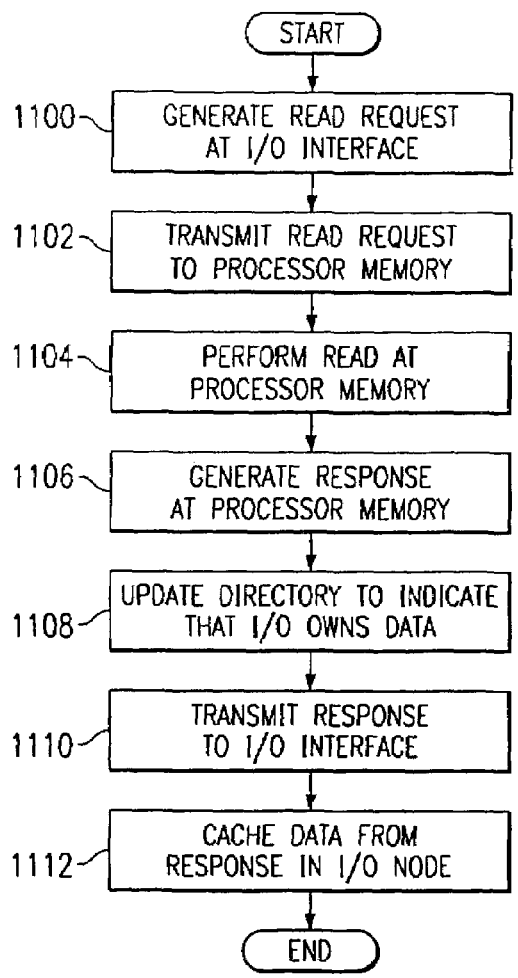
FIG. 11 is a flow diagram illustrating a method for caching exclusive read-only data at the I/O nodes of FIGS. 2 and 7 in accordance with one embodiment of the present invention.

FIG. 11 is a flow diagram illustrating a method for caching exclusive read-only data at the I/O nodes 46 in accordance with one embodiment of the present invention. This embodiment may be used to cache data maps or other suitable types of data.

The method begins at step 1100 where a read request 910 is generated at an I/O interface 140 of an I/O node 46. At step 1102, the read request 910 is transmitted through a router node 34 to a processor memory 72 of a processor node 22. At step 1104, the memory 72 performs a read of the data 82 requested by the I/O node 46. At step 1106, a read response 1010 comprising a copy of the requested data 82 is generated at the processor memory 72.

At step 1108, the directory 84 for the memory 72 is updated to indicate that the I/O node 46 owns the data 82 associated with the read request 910. At step 1110, the read response 1010 generated by the memory 72 is transmitted through the router node 34 to the I/O interface 140 of the I/O node 46. At step 1112, the data received in the read response 1010 is cached by the I/O node 46 in a cache 150, at which point the method comes to an end. In this way, the I/O node 46 may cache coherent data without the use of sharing vector resources.

Figure 12:
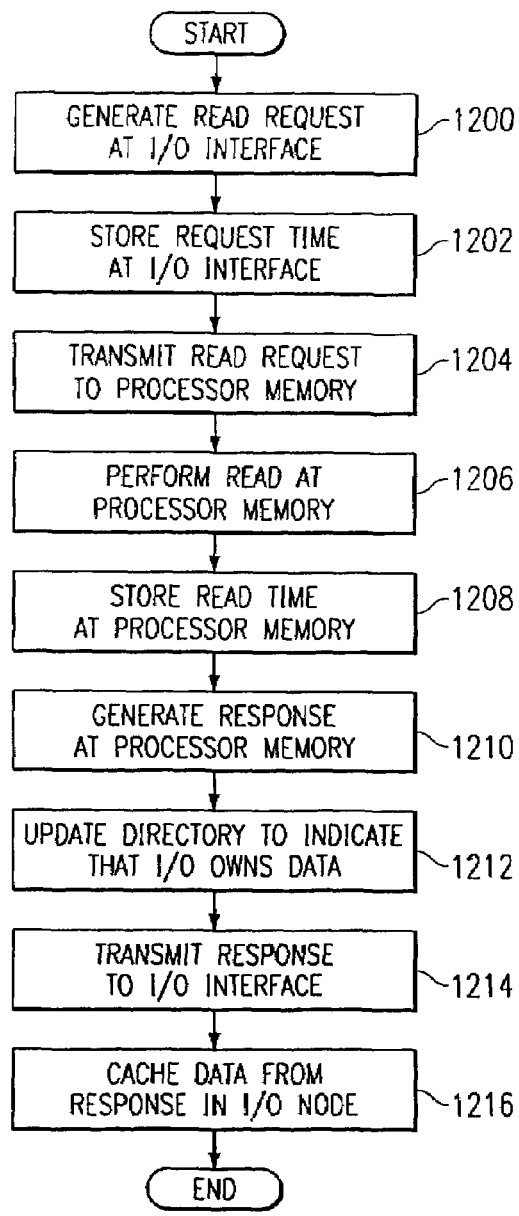
FIG. 12 is a flow diagram illustrating a method for caching exclusive read-only data at the I/O nodes of FIGS. 2 and 7 in accordance with another embodiment of the present invention.

FIG. 12 is a flow diagram illustrating a method for caching exclusive read-only data at the I/O nodes 46 in accordance with another embodiment of the present invention. In this embodiment, the cached data has limited longevity. This embodiment may be used to cache data streams or other suitable types of data.

The method begins at step 1200 where a read request 910 is generated at an I/O interface 140 of an I/O node 46. At step 1202, a request time, or a first time event, associated with the read request 910 is stored at the I/O interface 140. At step 1204, the read request 910 is transmitted through a router node 34 to a processor memory 72 of a processor node 22.

At step 1206, the memory 72 performs a read of the data 82 requested by the I/O node 46. At step 1208, a read time, or a second time event, associated with the read is stored at the processor memory 72. At step 1210, a read response 1010 is generated at the processor memory 72.

At step 1212, the directory 84 for the memory 72 is updated to indicate that the I/O node 46 owns the data 82 associated with the read request 910. At step 1214, the read response 1010 generated by the memory 72 is transmitted through the router node 34 to the I/O interface 140 of the I/O node 46. At step 1216, the data received in the read response 1010 is cached by the I/O node 146 in a cache 150, at which point the method comes to an end. In this way, both the memory 72 and the I/O node 46 can determine the duration of the availability of the data in the cache 150 to the I/O node 46.

FIG. 13 is a flow diagram illustrating one embodiment of a method for managing data cached according to the method of FIG. 12 at an I/O node 46. The method begins at step 1300 where timed data is identified in a cache 150 for the I/O node 46. Timed data comprises data with a status of exclusive read-only timed. At step 1302, the I/O node 46 determines the state of the timed data. This determination is made based on whether the predefined period of time has passed after an initiation event, such as the stored request time for the data.

At decisional step 1304, a determination is made regarding whether the state of the timed data is expired. If the state of the data is expired, the method follows the Yes branch from decisional step 1304 to step 1306 where the resource manager 152 of the I/O node 46 invalidates the timed data in the cache 150. However, if the state of the timed data is not expired, the method follows the No branch from decisional step 1304 and comes to an end. In this way, the I/O node 46 may manage timed data in the cache 150 such that the data is reliable.

FIG. 14 is a flow diagram illustrating one embodiment of a method for managing data cached according to the method of FIG. 12 at a processor node 22. The method begins at step 1400 where a processor node 22 receives a request to access data 82 in the memory 72 that has a status of exclusive read-only timed. At step 1402, the processor node 22 determines the state of the timed data 82. This determination is made based on whether the predefined period of time has passed after an initiation event, such as the read time associated with the data 82.

At decisional step 1404, a determination is made regarding whether the state of the timed data 82 is expired. If the state of the data 82 is expired, the method follows the Yes branch from decisional step 1404 to step 1406. At step 1406, the processor node 22 changes the state of the data 82 to normal. At step 1408, the processor node 22 responds to the request for access to the data 82 and the method comes to an end.

Returning to decisional step 1404, if the state of the timed data 82 is not expired, the method follows the No branch from decisional step 1404 to step 1410. At step 1410, the processor node 22 performs intervention processing for the timed data 82 and the method comes to an end. In this way, the processor node 22 may manage data 82 that has been cached in an I/O node 46 such that the I/O node 46 may reliably cache a copy of the data 82.

FIG. 15 is a flow diagram illustrating a method for intervention processing by a processor node 22 in accordance with one embodiment of the present invention. The method begins at step 1500 where the processor node 22 receives a request to access data 82 in the memory 72. At step 1502, the processor node 22 determines the status of the data 82 as indicated in the directory 84.

At decisional step 1504, a determination is made regarding whether the status of the data 82 is exclusive read-only, either timed or untimed. If the status of the data 82 is exclusive read-only, the method follows the Yes branch from decisional step 1504 to step 1506. At step 1506, the processor node 22 generates an invalidate message. At step 1508, the processor node 22 transmits the invalidate message to the I/O interface 140 in which a copy of the data 82 is cached.

At step 1510, the processor node 22 receives an acknowledge message from the I/O interface 140 indicating that the I/O interface 140 has received the invalidate message. At step 1512, the processor node 22 changes the status of the data 82 in the directory 84 to free. At step 1514, the processor node 22 responds to the request for access to the data 82 and the method comes to an end. Returning to decisional step 1504, if the status of the data is not exclusive read-only, the method follows the No branch from decisional step 1504 and comes to an end.

Although the present invention has been described with several embodiments, various changes and modifications may be suggested to one skilled in the art. It is intended that the present invention encompasses such changes and modifications as fall within the scope of the appended claims.

What is claimed is:

1. A multiprocessor system, comprising:
 a processing sub-system including a plurality of processors and a processor memory system;
 a scalable network operable to couple the processing sub-system to an input/output (I/O) sub-system;
 the I/O sub-system including a plurality of I/O interfaces;
 the I/O interfaces each operable to couple a peripheral device to the multiprocessor system and to store copies of data from the processor memory system in the local cache for use by the peripheral device; and
 a coherence domain comprising the processors and processor memory system of the processing sub-system and the local caches of the I/O sub-system, the local caches of the I/O subsystem operable to participate in the coherence domain through timed access to data in the processor memory system;
 wherein the I/O subsystem is operable to invalidate data upon expiration of a time interval and the processor memory system is operable to identify the data as free upon expiration of the time interval without sending any invalidation messages.

2. The multiprocessor system of claim 1, wherein at least one of the I/O interfaces comprises a Peripheral Component Interconnect (PCI) interface.

3. The multiprocessor system of claim 1, wherein the scalable network comprises a plurality of routers.

4. The multiprocessor system of claim 1, the processor memory system comprising a plurality of discrete processor memories.

5. The multiprocessor system of claim 4, wherein the discrete processor memories are each dedicated to a processor.

6. The multiprocessor system of claim 1, the processor memory system including a directory operable to identify data cached in an I/O interface.

7. The multiprocessor system of claim 6, the processor memory system operable to invalidate a copy of data stored in a local cache of an I/O interface in response to a request for the data by a processor.

8. The multiprocessor system of claim 1, the I/O interfaces each operable to pre-fetch data from the processor memory and to store the data in the local cache for use by a corresponding peripheral device.

9. A method for maintaining data at input/output (I/O) interfaces of a multiprocessor system, comprising:
 coupling a plurality of processors to a processor memory system;
 coupling a plurality of I/O interfaces to the processor memory;
 coupling a peripheral device to each I/O interface;
 caching copies of data in the processor memory system in the I/O interfaces for use by the peripheral devices; and
 maintaining coherence between the copies of data in the I/O interfaces and data in the processor memory system, the I/O interfaces operable to participate in coherence through timed access to the data in the processor memory system;
 invalidating the data at the I/O interfaces upon expiration of a time interval;
 identifying the data as free in the processor memory system upon expiration of the time interval, invalidating and identifying the data being performed without sending any invalidation messages.

10. The method of claim 9, wherein at least one of the I/O interfaces comprises a Peripheral Component Interconnect (PCI) interface.

11. The method of claim 9, further comprising coupling the I/O interfaces to the processor memory system through a scalable network.

12. The method of claim 9, further comprising coupling the I/O interfaces to the processor memory system through a scalable network comprising a plurality of routers.

13. The method of claim 9, wherein the processor memory system comprises a plurality of discrete processor memories.

14. The method of claim 13, wherein each discrete processor memory is dedicated to a processor.

15. The method of claim 9, further comprising identifying in the processor memory system data having a copy cached in the I/O interfaces.

16. The method of claim 15, further comprising:
 invalidating a copy of data cached in an I/O interface in response to a request by a processor for the data; and
 releasing the data to the processor after invalidation of the copy in the I/O interface.

17. The method of claim 9, further comprising:
 pre-fetching data from the processor memory system; and
 caching the data in an I/O interface for use by a corresponding peripheral device.

18. An input/output (I/O) interface, comprising:
 a peripheral communications port;
 a local cache operable to store copies of data from a processor memory coupled to the I/O interface; and
 a resource manager operable to invalidate outdated data from the local cache to maintain coherence with the processor memory without receiving an invalidation message.

19. The I/O interface of claim 18, wherein the interface is a Peripheral Component Interconnect (PCI) interface.

20. The I/O interface of claim 18, the resource manager further operable to invalidate copies of data from the local cache in response to instructions from the processor memory.

21. The I/O interface of claim 18, wherein a copy of data is outdated upon expiration of a time period for storage of the copy.

22. A method for interfacing a peripheral device with a multiprocessor system, comprising:
    storing copies of data in a processor memory system of the multiprocessor system in a local I/O memory at an interface for the peripheral device; and
    maintaining coherence between data in the processor memory system and copies of data in the local I/O memory, the local I/O memory operable to participate in coherence through timed access to the data in the processor memory system;
    invalidating the data at the I/O interfaces upon expiration of a time interval;
    identifying the data as free in the processor memory system upon expiration of the time interval, invalidating and identifying the data being performed without sending any invalidation messages.

23. The method of claim 22, further comprising maintaining coherence between data in the processor memory system and copies of data in the local I/O memory by at least removing outdated copies of data from the local I/O memory.

24. The method of claim 22, further comprising maintaining coherence between data in the processor memory system and copies of data in the local I/O memory by at least removing copies of data from the local I/O memory in response to instructions from the processor memory system.

25. The method of claim 23, wherein a copy of data is outdated upon expiration of a time period for storage of the copy.

* * * * *